3,095,333
PROCESS FOR THE MANUFACTURE OF LAMINATED MAGNETIC CORES

Edward A. Sweeney, Dayton, and Joseph B. Carr, Miamisburg, Ohio, assignors to General Motors Corporation, Detroit, Mich., a corporation of Delaware
No Drawing. Filed Nov. 14, 1960, Ser. No. 68,605
3 Claims. Cl. (148—121)

This invention relates to manufacture of magnetic cores of laminated metal for dynamoelectric machines, and particularly, to predetermined treatment of metal for control of degree of sticking of laminations to each other and also reduction of core losses in stacked laminations of metal.

An object of this invention is to provide a new and improved procedure for control of annealing time and temperature to predetermined ranges and thereby to have less sticking between metal laminations and simultaneously more favorable conditions of lower magnetic core loss electrically.

Another object of this invention is to provide procedure for improving manufacture of stacked metal laminations as magnetic cores for dynamoelectric machines including steps of stacking laminations of metal into a joined group, and passing the group laminations at a predetermined rate of travel through heat controlled within a range of predetermined maximum and minimum temperature values thereby to have quality control as to sticking of laminations as well as simultaneously to have reduction of magnetic core loss encountered in a finished magnetic core for dynamoelectric machines.

A further object of this invention is to provide procedure for improvement of electro-mechanical quality of magnetic stator cores to be assembled in dynamoelectric machines and including specifically a step of critically subjecting magnetic cores of laminated metal such as cold rolled steel to an optimum annealing cycle of time and temperature to result in substantially lower magnetic losses in steel and simultaneously less sticking of laminations.

Another object of this invention is to provide procedure for improvement of electro-mechanical quality of magnetic stator cores to be assembled in dynamoelectric machines and consisting specifically of a step of critically subjecting magnetic cores of laminated metal such as cold rolled steel to an optimum annealing cycle of time and temperature to result in lower eddy current and magnetic losses in steel and simultaneously less sticking of laminations by use of an annealing temperature range of 1350° F. to 1450° F. for an annealing time of substantially two hours.

Further objects and advantages will become apparent from the following description in which preferred embodiments of the present invention are clearly set forth.

Manufacturers of dynamoelectric machines such as fractional horsepower motors are continually investigating and making an effort to decrease cost of their product without sacrificing quality or even with an improvement in quality. Most dynamoelectric machines utilize expensive grades of steel laminations having silicon content ranging between ½% and 4% and now it has been found that by use of cold rolled steel material lacking silicon and with carbon in a range up to 0.1% maximum costs in a production of dynamoelectric machine laminations can be appreciably reduced. With increased volume of usage of cold rolled steel laminations for commercial dynamoelectric machines there exists a need to determine under certain conditions the extent of magnetic core losses including eddy current and interlamination resistance as well as effect of sticking with respect to such losses. Known variables having effects on magnetic properties of metal laminations include steel composition, hardness, grain size, sticking of laminations to each other during annealing, and interlamination resistance.

Sticking of laminations to each other is particularly undesirable because it increases eddy current losses in a stack or group of metal laminations joined for use as a stator lamination assembly on dynamoelectric machines. Due to having laminations sticking together during annealing, it has been necessary in some instances to "crack" or separate the sticking laminations by use of force in an added step during manufacturing procedure which needless to say increased expense of the final product due to increased labor cost and the like. Sometimes to assure full and complete separation each lamination is removed from a stack individually to make certain that no two laminations remain stuck together. During tests conducted in conjuction with discovery of the improvements of the present invention, it was found that there is no correlation between sticking and wet or dry laminations. Due to problems in bore distortion encountered as a result of application of force to effect cracking or separation of laminations such an approach for solving the question of increased losses due to sticking proved to be impractical. Using substantially identical samples of metal laminations it was possible to note that materials purchased from various suppliers or purveyors would be substantially alike as to hardness as well as grain size which are factors more dependent on steel mill processing than on manufacturing procedure followed by dynamoelectric machine manufacturers. Telescopic observations indicated that grain size of cold rolled steel is not solely dependent on annealing conditions but other factors including degree of cold work, rolling and coiling temperatures, position in the coil, and prior ingot position are factors influencing the grain size achieved by annealing process. These are factors controlled in purchase of materials from suppliers and final grain size can neither be dictated by the annealing conditions nor can they be made uniform by a particular annealing operation. However, during an annealing operation in a manufacturing procedure followed by dynamoelectric machine manufacturers, a phenomenon occurs whereby in effect there is a sticking or "welding" of a stack of laminated steel at an indeterminate yet large number of tiny points on the face or surface of each adjoining laminations. This phenomenon of sticking of laminations has been a problem associated with the annealing of steel laminations by dynamoelectric machine manufacturing processes for many years. Sticking is not limited to the process of annealing cold rolled steel but is also a problem in the annealing of higher grade steels for similar manufacturing purposes. Also it was found that the problem is not in any way peculiar to metal materials purchased from any particular source of supply. As indicated earlier, sticking is undesirable because it increases the interlamination eddy current losses in a lamination stack of steel. Sticking of cold rolled steel became so severe that in place of annealing an assembled stator it was necessary to anneal a loose stack of stator laminations held together by staked rivets and then separating the sticking laminations by cracking or striking them against a solid object prior to final riveting. However this modified procedure required a costly additional operation and therefore an extensive investigation of sticking tendencies was conducted. It was found that sticking increases with increasing time as temperature for annealing is maintained at a substantially constant temperature and that the degree of sticking increases gradually along a curve with decreasing slope and at a slower rate after three hours of annealing of a lamination assembly in a heat zone.

Tests were conducted by use of seven and one-half pound stacks of unpierced cold-rolled steel stator laminations representing structure used for a majority of dynamoelectric machine production. Before and after annealing, data compiled and recorded to determine effects on core loss provided basis for a specific improved procedure to manufacture magnetic cores of laminated metal for dynamoelectric machines. The annealing time referred to herein is defined as the time elapsed between placing of a sample into a heat zone of a furnace and removal of the sample to a cooling vestibule. The annealing atmosphere was provided by an exothermic gas generator burning natural gas with a heat value of 1,050 B.t.u.'s per cubic foot. The specific gravity of the atmosphere gas was maintained at 0.95 with a constant dew point at the output of the generator of 63° F. The atmosphere was prepared by burning an air-natural gas mixture in the combustion chamber and then cooling the resulting gaseous mixture in a spray-type water cooler to reduce the amount of water vapor in the gas and control the dew point of the gas. An annealing cycle for the present improvement in manufacturing procedure includes steps of heating for a time required to bring a stack of joined laminations to a predetermined temperature level, maintaining this temperature level followed by cooling time and quenching temperature. Purposely, time required to heat for bringing the work or sample to temperature as well as cooling time and the quenching temperature were held constant to discover optimum annealing temperature conditions. The initial heating step was accomplished in a time range between fifty and sixty minutes followed by at least one hour of maintaining an annealing temperature of 1400° F. before cooling with a fan from this temperature level to between 100° F. and 200° F. all over a period of 200 minutes. Tests as to relationship of core loss with respect to annealing time led to a discovery that the largest decrease in core loss occurs between zero hours anneal and one hour in the heat zone of a furnace once the sample was brought up to annealing temperature. As indicated earlier, the time required for initial heating was in a range between fifty and sixty minutes and then the second hour of maintaining annealing temperature accomplished the largest decrease in core loss. Average core loss for two groups of samples from a first supplier of steel dropped from 7.8 watts per pound for unannealed steel to 2.8 watts per pound after one hour in the furnace at 1400° F. Similarly, steel from a second source of supply displayed similar reductions in core loss from 7.5 watts per pound for unannealed steel to 2.6 watts per pound at one hour. It was found that after two hours in the furnace at maintained annealing temperature the core loss was reduced only slightly more to 2.5 watts per pound for the samples of the first source and 2.4 watts per pound for the samples of the second source of supply. The greatest reduction in core loss after five hours of annealing time of the samples of the first supplier resulted in a lowest core loss value of 2.1 watts per pound assumed to represent 100% anneal. Then selecting a value of 7.7 watts per pound to represent a zero percent anneal, a value of core loss of 4.3 watts per pound at 15 minutes of maintaining annealing temperatures representing a 61% anneal. It was found that an annealing time maintained for a period of substatially one hour reduced the average core loss of all steel laminations an average of 95% with a minimum reduction of 91%. Maintaining the predetermined annealing temperature of 1400° F. for a period of two hours increased the average reduction to 98% and further annealing from three to five hours of maintained annealing temperature increased the average reduction to nearly 100% for all heats. However, the increased quality as to core loss characteristics obtainable by annealing steel longer than one hour or two hours may be overshadowed by variables introduced in succeeding machining and assembly operations. After determining the range of optimum annealing time at 1400° F. it was necessary to investigate the effects of temperature on core loss in order to determine optimum value of that cycle component.

During the investigation of the effects of temperature on core loss, the annealing time was held constant at substantially two hours since this was the shortest cycle found to produce nearly a 100% anneal. Using samples from the second source of supply indicated above, temperature was varied from 1100° F. to 1700° F. in fifty degree intervals. Results of these investigations show that the lowest core loss values are attained in a temperature range from 1250° F. to 1500° F. To obtain an indication of average value of core loss at least three test samples were evaluated with the result of finding that the lowest core loss values are obtained specifically in a preferred temperature range from 1300° F. to 1450° F. at which values the average core loss in this range was 2.4 watts per pound with a maximum variation of 0.4 watt per pound which is 17% of the average. In view of the large amount of variation in core loss at 1300° F., a conclusion was reached that optimum temperature range for annealing is between 1350° F. and 1450° F. Thus there are definite optimum ranges of time and temperature for successful annealing of cold rolled steel used for a manufacturing of dynamoelectric machine stator lamination assemblies.

Annealing time investigations show that average core loss of all samples of cold rolled steel laminations subjected to heating in accordance with the present disclosure can be reduced from 7.6 watts per pound for the unannealed steel to 2.6 watts per pound for samples annealed at 1400° F. for one hour. By annealing the samples at 1400° F. for two hours, the core loss was reduced to 2.5 watts per pound meaning that a reduction in core loss of from 95% to 98% was realized by maintaining annealing temperature in the one to two hour time range at a value of 1400° F. The core loss of these same samples was reduced to a minimum in the annealing temperature range of 1350° F. to 1450° F. using an annealing time of substantially two hours.

Since the degree of sticking between laminations increases with increasing annealing time and temperature it was found that the optimum temperature range of 1350° F. to 1450° F. at an annealing time of substantially two hours simultaneously results in a minimum of sticking of laminations to each other and consequently a reduction in core loss as well as eddy current losses of a magnetic core including steel laminations joined to each other. Also at temperatures above 1450° F. the laminations are subject to heat distortion that occurs sharply and disturbingly beyond this point. The laminations can be held suitably by rivets for joining either before or after the annealing operation and also by welding either before or after the welding operation. Thus the additional costly step of "cracking" or separating the laminations after annealing can be completely avoided and eliminated with a resulted saving in cost of manufacturing procedure so far as labor and other factors are concerned while simultaneously improving the quality and reducing the core loss in the metal laminations of the assembled stators. Specifically the maintaining of annealing temperature should not be varied above or below the optimum range of 1350° F. and 1450° F. Previously stators manufactured using cold rolled steel have been produced by use of maintained annealing temperatures for at least three and one-half hours and preferably in accordance with the present invention the time cycle can be shortened to two hours without sacrificing annealing quality of the cold rolled steel laminations used for stator assemblies provided the work load temperature reaches substantially 1400° F. within fifty minutes after entering a furnace. During periods of increased sticking of annealed laminations, a shortening of this time cycle to maintaining of annealing temperatures for one hour for example will reduce the severity of the sticking phenomenon.

Each group of samples investigated required 4,095 laminations that were subjected to the above manufacturing procedures.

Samples of cold rolled steel laminations made of material from the first and second sources noted above were found to have a hardness for the unannealed steel of ninety-three Rockwell B and ninety-seven Rockwell B, respectively. However the determination of core loss of the samples of stator lamination stacks averaged 2.4 watts per pound plus or minus 2%. Thus it was concluded that core loss of the steel was more dependent on the annealing cycle than on the hardness of the steel.

Test data was obtained to show a tendency for core loss to decrease with an increase in grain size. However as indicated earlier, telescopic observations indicate that grain size is not solely dependent on the annealing conditions. Sticking of laminations to each other was found to increase with increasing time at a temperature such as 1400° F. Sticking increases at a slower rate after three hours in such a heating environment. It was found conclusively that severity of sticking during annealing can be lessened appreciably by annealing at a lower temperature (down to 1350° F.) and a shorter time (down to one hour).

As to interlamination resistance, it is noted that electrical resistance is definable as opposition offered by a material to the passage of an electric current. It follows therefore that if the interlamination resistance of a stack of laminated steel is increased, the current between laminations, and thus the magnetic losses are reduced. Data became available to determine how interlamination resistance is affected by time, temperature and sticking. The interlamination resistance of the unannealed test samples was found to vary over a wide range. Tendency for interlamination resistance to decrease was encountered during the first hour of the annealing cycle and then increased with increasing time after one hour in the heat zone of a furnace. In other words, the oxides on steel are reduced during the first hour and then steel again becomes oxidized with increased time at a predetermined temperature level. No parallel or similarity can be found as to interlamination resistance and core loss with respect to annealing time.

However, current in the samples of joined laminations annealed and core loss with respect to time of annealing were found to be substantially proportional to each other.

It is to be noted that considerable capital expenditure is involved in provision of annealing furnace equipment and any reduction in the number of furnaces required will result in an appreciable savings. Therefore, if multiple layers of stator lamination assemblies can be annealed simultaneously using fewer furnaces there is provided a considerable advantage. Accordingly it has previously been found that excessive sticking occurs when stator laminations are run through annealing furnaces having the assemblies stacked on top of each other for example three layers high. Sticking of laminations to each other decreases as time for maintaining annealing temperature decreases. This decrease is much more pronounced due to weight on stators stacked in multiples than on those annealed in a single layer. The optimum annealing cycle of time and temperature for cold rolled steel laminations as set forth earlier results in the lowest magnetic losses in the steel. Savings in capital expenditure for annealing equipment such as furnaces as well as elimination of labor cost for additional steps of manually forcing apart laminations can be taken as advantages in addition to those realized by reduction of sticking of laminations to each other and corresponding losses magnetically. It is to be understood that a protective atmosphere can be used in the annealing furnace to minimize scaling of the work. This special or protective atmosphere also avoids the tremendous sticking that would occur by annealing in air atmosphere because oxygen content is reduced so that oxidation is avoided and reduced due to a mixture of limited air, carbon monoxide, and carbon dioxide at a predetermined specific gravity. Suitable baffles or muffling means can be provided in annealing chambers to stabilize and uniformly distribute the special or controlled atmosphere during the maintenance of annealing temperature. The optimum range of annealing temperature at two hours annealing time is from 1350° F. to 1450° F. Below 1350° F. the variation in final core loss is excessive. Above 1450° F. the final core loss increases together with increased sticking tendencies and warpage. Hardness of steel does not appreciably affect the range of core loss of cold rolled steel used for dynamoelectric machine laminations.

While the embodiments of the present invention as herein disclosed constitute preferred forms it is to be understood that other forms can be adopted.

What is claimed is as follows:

1. In a procedure for the improved quality of stators having sheet metal laminations stacked in groups, in combination therewith, the steps comprising forming the stator from laminations of unannealed cold rolled steel and thereafter heating the stator in a temperature range between 1350° F. and 1450° F. for substantially two hours such that a temperature of 1400° F. is reached during the first hour thereof.

2. In a procedure for manufacture of a laminated steel magnetic core for dynamoelectric machine stator assembly, in combination therewith the improvement which comprises the steps of, forming the stator assembly from laminations composed of steel, and thereafter heating said stator assembly in a temperature range of 1350° F. to 1400° F. for a time of substantially two hours whereby eddy current and magnetic core losses are reduced appreciably and simultaneously sticking of laminations to each other is avoided.

3. In a dynamoelectric-machine lamination-assembly manufacturing procedure involving in combination therewith, the steps comprising, feeding groups of stacked and joined laminations of unannealed cold rolled steel to a predetermined location, and thereafter heating the stacked and joined lamination assembly in a temperature range of 1350° F. to 1450° F. for a minimum of two hours and less than three hours resulting in a substantial reduction of magnetic core losses and simultaneously less interlamination sticking in the stacked and joined lamination assembly in which heat distortion and warpage are also avoided.

References Cited in the file of this patent

UNITED STATES PATENTS 2,672,429    Malloy _____ Mar. 16, 1954